United States Patent
Galli

(10) Patent No.: US 6,297,664 B1
(45) Date of Patent: Oct. 2, 2001

(54) ACCURATE ACTIVE TERMINATION DEVICE

(75) Inventor: Giovanni Galli, Galati Marina (IT)

(73) Assignee: STMicroelectronics S.r.l., Agrate Brianza (IT)

(*) Notice: Subject to any disclaimer, the term of this patent is extended or adjusted under 35 U.S.C. 154(b) by 0 days.

(21) Appl. No.: 09/430,357

(22) Filed: Oct. 28, 1999

(30) Foreign Application Priority Data

Oct. 28, 1998 (EP) .................................. 98830652

(51) Int. Cl.[7] .................... H03K 17/16; H03K 19/003
(52) U.S. Cl. ......................... 326/30; 326/82; 326/83; 710/129
(58) Field of Search ......................... 326/30, 82, 83, 326/86; 710/129

(56) References Cited

U.S. PATENT DOCUMENTS

| | | | |
|---|---|---|---|
| 5,107,230 | * 4/1992 | King | 333/32 |
| 5,239,559 | * 8/1993 | Brach et al. | 375/36 |
| 5,362,991 | * 11/1994 | Samela | 327/540 |
| 5,382,841 | * 1/1995 | Feldbaumer | 326/30 |
| 5,528,167 | * 6/1996 | Samela et al. | 326/30 |
| 5,553,250 | 9/1996 | Miyagawa et al. | 395/309 |
| 5,635,873 | 6/1997 | Thrower et al. | 330/253 |
| 5,726,583 | * 3/1998 | Kaplinsky | 326/30 |
| 6,084,432 | * 7/2000 | Dreps et al. | 326/83 |
| 6,157,215 | * 12/2000 | Gabara et al. | 326/83 |

FOREIGN PATENT DOCUMENTS 0 531 630 A1    3/1993    (EP) .

* cited by examiner

Primary Examiner—Michael Tokar
Assistant Examiner—Daniel D. Chang
(74) Attorney, Agent, or Firm—Theodore E. Galanthay; Robert Iannucci; Seed IP Law Group, PLLC

(57) ABSTRACT

An active precision termination of the type incorporated in a voltage regulator for feeding the lines of an external bus is presented. Each termination includes a matching impedance connected in series to a switch formed by a MOS transistor, including a cell formed by a plurality of circuit branches provided in parallel and coupled to a unique output terminal. Each branch includes an input coupled to the series of the impedance and of the switch and receiving a control voltage signal. The body terminal of each MOS transistor receives a corresponding control signal via an inverter, whereas the control terminal of each MOS transistor receives a corresponding control voltage signal.

13 Claims, 9 Drawing Sheets

ACCURATE ACTIVE TERMINATION DEVICE

TECHNICAL FIELD

The present invention relates to a method for creating an active precision termination onto a silicon semiconductor and to a so obtained active precision termination and, in particular, the invention relates to a termination of the above mentioned type comprising a matching impedance connected in series to a switch formed by a MOS transistor.

BACKGROUND OF THE INVENTION

The present invention is the fruit of the development of a Bus Supplayer device, that is to say a voltage regulator for feeding a Bus which is portable with some standards: SCSI (Small Computer System Interface), SCSI-2, SCSI-3, as well as provided with at least nine active termination with high precision (110Ω at 2%), although the description hereinbelow is made with reference to this specific field of application with the only purpose of simplifying the illustration.

A device of the above-mentioned type essentially operates as a voltage regulator and feeds every line of the Bus via a so called active termination comprising a matching impedance with a switch associate thereto. A voltage regulator and the active termination (switch+resistance) are formed inside the integrated circuit.

A regulator of known type is schematically illustrate in FIG. 1. In conditions of operation, the regulator feeds every line of the bus with a matching impedance of high precision; in alternative, if required by the CPU that manages the Bus, the regulator can set the terminations into a state of high impedance disconnecting itself from the Bus. Hence the output of the regulator is interfaced with the Bus by means of a switch that is usually formed with a MOS transistor connected in series to a respective resistor for every line of the Bus.

A conclusive condition for the efficiency of the regulator is the precision of the matching impedance, that corresponds to the resistance "seen" by the output pin of the regulator connected to the line of the Bus in direction of the inside of the integrated circuit.

$$R_{TERM} = R_{DS\_MOS} + R \quad (1)$$

The termination connects to the output of the regulator, which represents a node at low impedance.

The precision of the resistance $R_{TERM}$ must be further maintained in presence of potential changes in the power supply, in temperature, and also with respect to the fluctuations of the voltage of the bus line between $V_{IN}$ and GND.

In the past, for SCSI applications the regulators of this kind were always integrated and formed interfacing them with each one of the Bus lines via resistors, and possibly switches, external to the integrated circuit. Obviously this created serious problems of overall circuit dimensions, as well as higher costs and management burden of the regulator Bus system.

In FIG. 2 an example of a regulator formed according to this approach proposed by the prior art is shown.

A further method for obtaining a resistive termination with high precision, internal to the integrated circuit incorporating the bus, is that of using a technique known as "Laser Trimming". Essentially, during the EWS (Electrical Wafer Sort) test phase of the integrated circuit, the resister connected in series to the MOS switch undergoes a trimming action by a laser beam in such a way to calibrate the resistive layer up to a desired value.

It is clear though that such a known solution needs an engineered system comprising the laser trimming and the technology for creating a device able to stand the trimming action.

In FIG. 3 a schematic view of a resistive termination cell is shown, which undergoes a trimming action by means of the laser trimming technique.

SUMMARY OF THE INVENTION

Embodiments of the present invention devise a new method for forming a resistive precision termination on a silicon semiconductor substrate, thus obtaining a new type of resistive precision termination having structural and functional characteristics such to overcome the drawbacks highlighted with reference to the prior art and, in particular not to require the use of the laser trimming technique.

A cell is formed by a plurality of circuit branches provided in parallel and leading to a unique output terminal, each branch comprising an input coupled to the series of an impedance and a switch and receiving a control voltage signal. The control of the various branches by means of the control voltages is such to allow the value of the termination resistance to pass from an initial value to a final desired value with a range of variation corresponding to steps of a trimming action. In this way it is possible to form a precision resistor without using the laser trimming technique.

The features and the advantages of the method and of the circuit according to the invention will become clear from the following specification of an embodiment thereof, which is herein set as example for descriptive and non-limiting purposes, with reference to the attached drawings.

DETAILED DESCRIPTION

Figure 1:
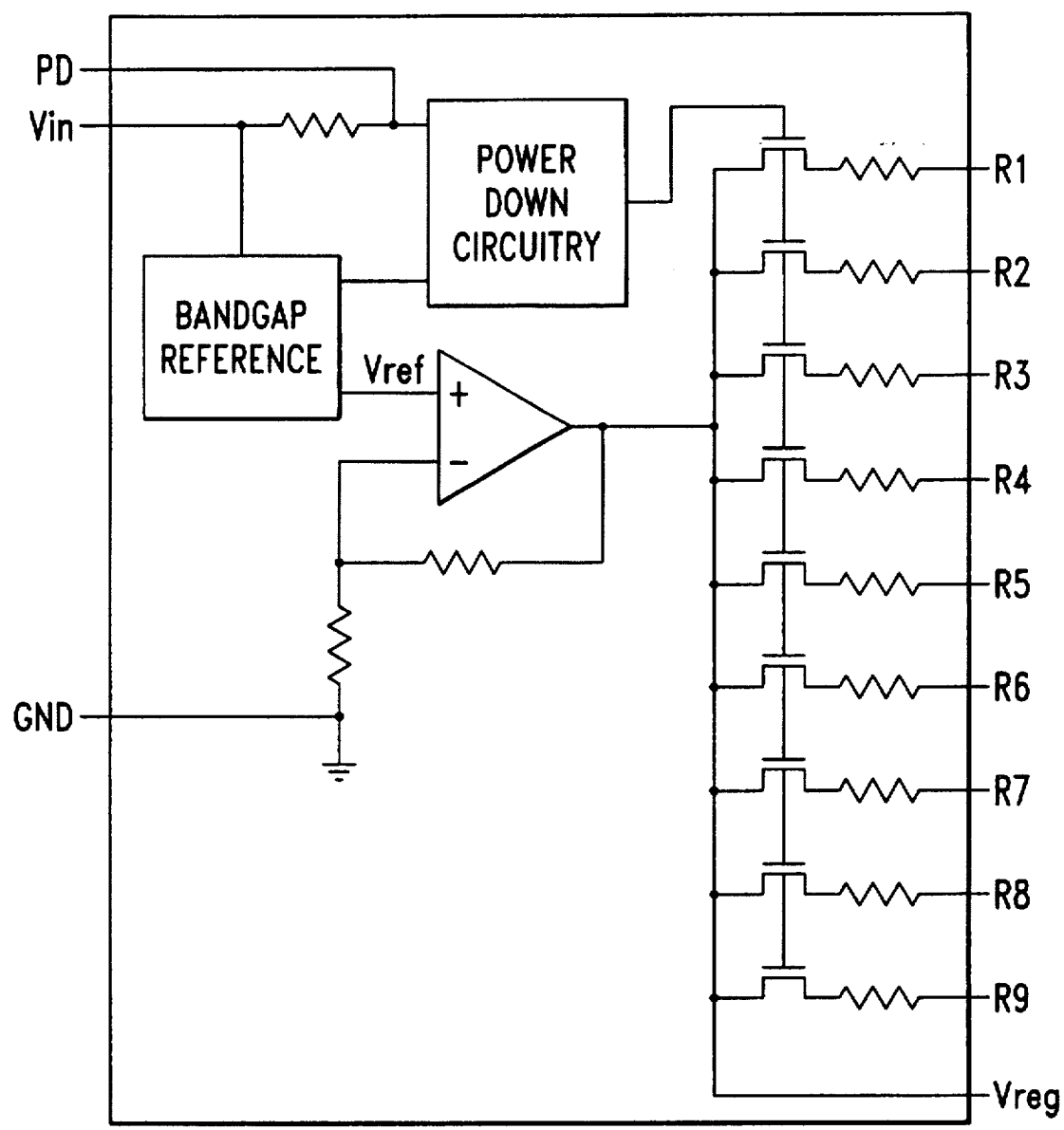
FIG. 1 shows a schematic view of a voltage regulator for a Bus line realized according to the prior art.
Figure 2:
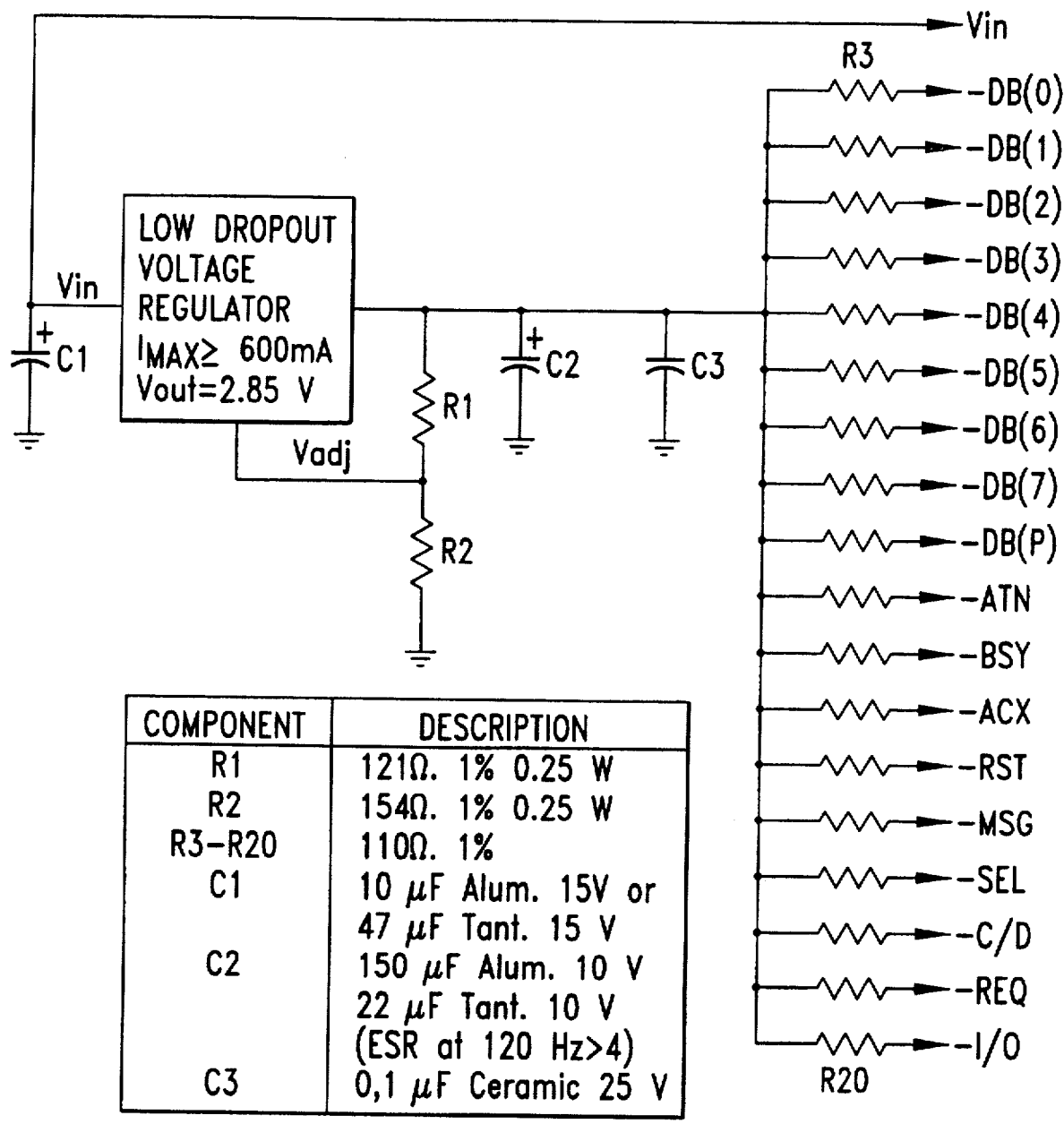
FIG. 2 shows a schematic view of a further example of regulator of known type.
Figure 3:
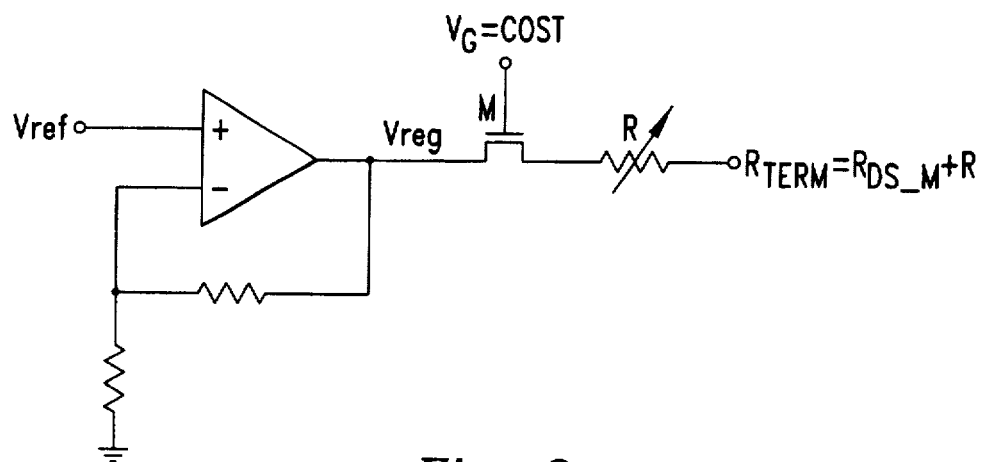
FIG. 3 shows a schematic view of an active termination cell which underwent trimming by means of the laser trimming technique.
Figure 4:
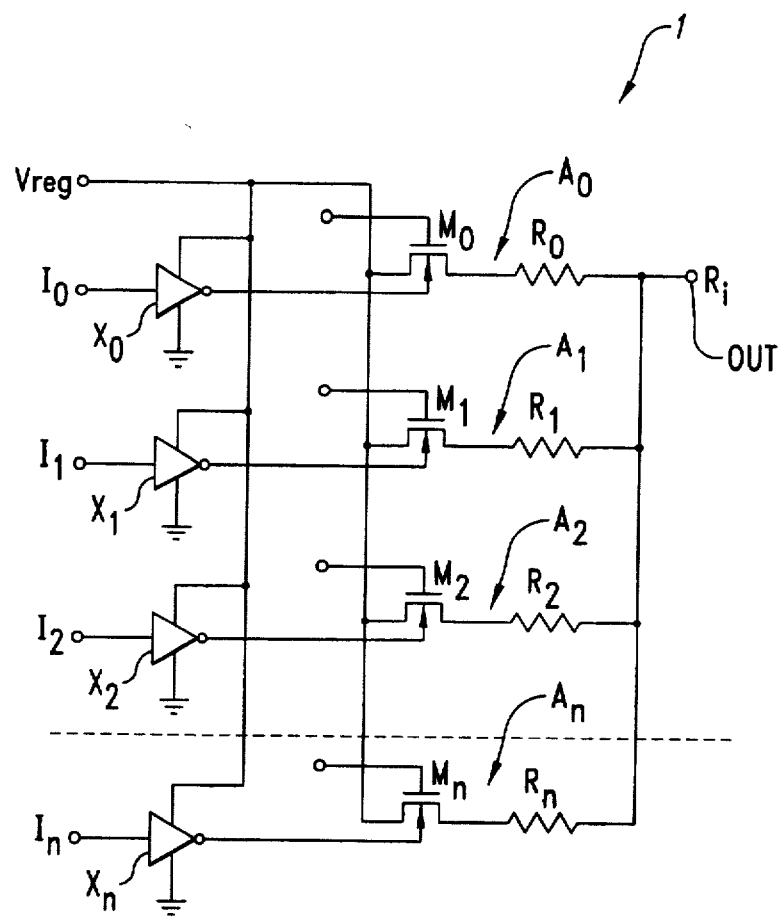
FIG. 4 shows an example of embodiment of an active termination according to the present invention.

With reference to the drawings, and in particular to the example of FIG. 4, an active termination 1, formed according to an embodiment of the present invention for a voltage regulator associated to a Bus of an integrated electronic circuit is shown. Neither the voltage regulator nor the Bus are represented in the drawings as they have a conventional structure. For the comprehension of the invention it suffices to know that the Bus comprises a plurality of n connecting lines.

The active termination according to at least one embodiment of the invention has a structure such to afford a great precision of the corresponding termination resistance, and also a compensation in temperature. In the following these features inherent to the invention are examined separately.

With reference back to FIG. 4, the termination 1 according to this embodiment of the invention comprises a cell formed by a plurality n of circuit branches A provided in parallel, each one being identified by means of a respective index from 0 to n, i.e., A0, A1, etc.

Each branch A comprises an input terminal I and the series of a transistor M of MOS type and of a resistance R. Each MOS transistor has a first and a second conduction terminal as well as a control gate. All the branches are coupled to an output terminal OUT.

A first branch Ao comprises an input terminal Io and the series of a transistor Mo and of a resistance Ro; whereas a generic branch Aj comprises an input terminal Ij and the series of a transistor Mj and of a resistance Rj.

Each one of the inputs I is connected to a corresponding inverter X having its output connected to the body terminal, or "bulk", of the transistor M of the respective branch A.

Each inverter X is coupled between a first voltage reference Vreg and a second reference voltage GND. The first voltage reference Vreg is also applied to each first conduction terminal of each transistor M.

The gate terminals of the transistors M are kept at a predetermined value of control voltage Gm (with m varying from 0 to n). Respective voltages of value Bm (with m varying from 0 to n) are also applied to the various input terminals I.

A proper generator circuit generates the control voltages Gm for driving the gate terminals of the MOS transistors M and the control voltages Bm for controlling the bulk terminals of the transistors M themselves.

The generation of the control voltages Gm is foreseen in such a way to take at the beginning the transistor Mo only to the switch-on state ON, leaving in the switch-off state OFF all the other transistors; accordingly the resistance of the termination resistance is equal to $$R_{TERM\_BEGIN} = R_{DS\_M0} + R0 \qquad (2)$$

the MOS transistor M0 and the resistor R0 are dimensioned in such a way that in case of the maximum spread towards the minimum (referred to the restive values) of the diffusion process, the following result is achieved:

$$R_{TERM\_BEGIN} = R_{DS\_M0\_MIN} + R_{0\_MIN} = 110\Omega \qquad (3)$$

and therefore $$R_{TERM\_BEGIN} = R_{DS\_M0\_TYP} + R_{0\_TYP} \geq 110\Omega \qquad (4)$$

The system needs therefore an operation of calibration during the EWS to decrease the resistance of the termination down to 110Ω, as predetermined with the preset error margin.

The MOS $M_1$ and the resistor $R_1$ are dimensioned in such a way that if $M_1$ is in the ON state, the following result is achieved:

$$110 = 110.5 // (R_{DS\_M1} + R_1) \qquad (5)$$

so that if $$R_{TERM\_BEGIN} = R_{DS\_M0} + R_0 = 110.5\Omega \qquad (6)$$

introduced the branch M1-R1, the following equation is obtained:

$$R_{TERM\_FINAL} = (R_{DS\_M0} + R_0) // (R_{DSM1} + R_1) = 110\Omega \qquad (7)$$

wherefrom it can be inferred that the insertion of the branch containing the MOS $M_1$ and the resistor $R_1$, taking the MOS $M_1$ to the state ON, a variation in the resistance of the termination is determined equal to −0.5Ω with respect to the initial value equal to 110.5Ω, thus determining a trimming action of less significant weight (determined in this specific instance equal to −0.5Ω on 110.5Ω). The cell in FIG. 4 can be hence dimensioned in such a way that:

the branch containing M1 and R1 (with M1 in the ON state) introduces a variation of −0.5Ω with respect to 110.5Ω;

the branch containing M2 and R2 (with M2 in the ON state) introduces a variation of −1Ω with respect to 111Ω;

the branch containing M3 and R3 (with M3 in the ON state) introduces a variation of −2Ω with respect to 112.5Ω;

the branch containing M4 and R4 (with M4 in the ON state) introduces a variation of −4Ω with respect to 114Ω;

the branch containing M5 and R5 (with M5 in the ON state) introduces a variation of −8Ω with respect to 118Ω;

the branch containing M6 and R6 (with M6 in the ON state) introduces a variation of −16Ω with respect to 116Ω;

the branch containing M7 and R7 (with M7 in the ON state) introduces a variation of −32Ω with respect to 132Ω;

Each parallel branch observes the following conditions (8) and (9)

$$R_{BRANCH\_m} = R_{DS\_m} + Rm \qquad (8)$$

$$R_{DS\_m} = \alpha R_{BRANCH\_m}$$

$$Rm = \beta R_{BRANCH\_m} \text{ with } \alpha + \beta = 1 \qquad (9)$$

In this way the parallel trimming does not modify the pattern of the resistance of the termination in relation to temperature; in fact the ratio between $R_{DS\_m}$ and $R_m$ is constant, a condition which cannot be true with the laser trimming technique.

The introduction of the various branches MOS-Resistor allows therefore to decrease the initial value of the resistance of termination from the initial value to a desired value (110Ω in the example take herein into consideration) with a range of maximum variation (equal to −63.5Ω type in the example herein taken into consideration) and with steps corresponding to a trimming action having a least significant weight (equal to 0.5Ω type in the example herein taken into consideration).

The desired precision and the spread of the process determine the minimum step of trimming and the number n of branches MOS-Resistors necessary to complete with success the trimming action.

The precision of the system is at its highest in case the process is shifted towards the maximum values, that is to say with higher resistances than the typical case; whereas it is at its lowest in case the process spread is shifted towards the minimum values, with lower resistances with respect to the typical case.

The driving of the bulk terminals is such to take those terminals to the value Vreg in case that the MOS operative condition herein taken into consideration is foreseen, whereas it is such to take those terminals to the value GND in the case the condition of high impedance of the termination is foreseen.

This kind of driving affords: maximum efficiency of the MOS in operative condition; bidirectionality of the transistor MOS in that the system is dimensioned in such a way to have $R_{DS\_n} \ll Rm \square V_{DS} \ll V_{Rm}$ in any operative condition of the Bus lines, that may undergo rushes from GND to $V_{IN}$, the junction P-N formed by the region Pwell_Bulk-N_Drain will not be directly polarized; and a safe shut down in case it is wished that the system runs at high impedance.

Figure 5:
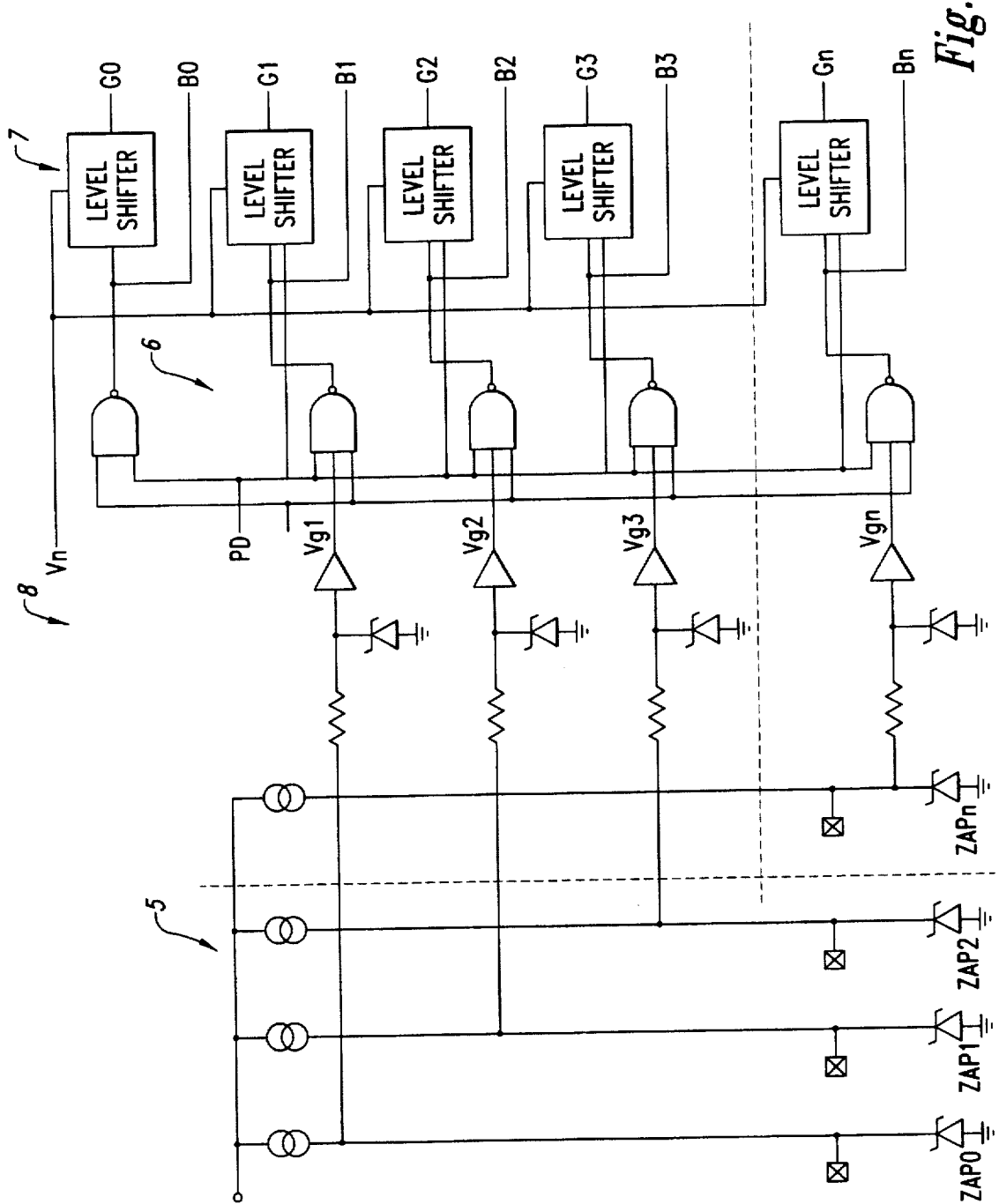
FIG. 5 shows a schematic view of a circuit generator of a plurality of voltage control signals applied to the termination of FIG. 4.

The generation of the control voltages Bm and Gm is provided by a generator circuit 8 shown in FIG. 5. The action of trimming is carried out via a conventional network of firing incorporating zener diodes of zapping type ZAP. In FIG. 5 an example of embodiment of such network is schematically shown, whereby the network is indicated with 5.

A decoding network 6 is connected in cascade to the zener ZAP network 5, network 6 which is necessary, considering that besides the trimming action ON-OFF, controls are foreseen both from the outside of the integrated circuit (for example for a Power Down with high impedance of the terminations) and from the inside of the circuit in case of short-circuits on the output of the regulator.

Furthermore, a proper network 7 of level shifter destined to shift the level of the decoding network 6, for example from 0V to the value of $V_{IN}$ in the voltage Vn generated by the stage 8 of thermal compensation that will be hereinbelow discussed.

Figure 6:
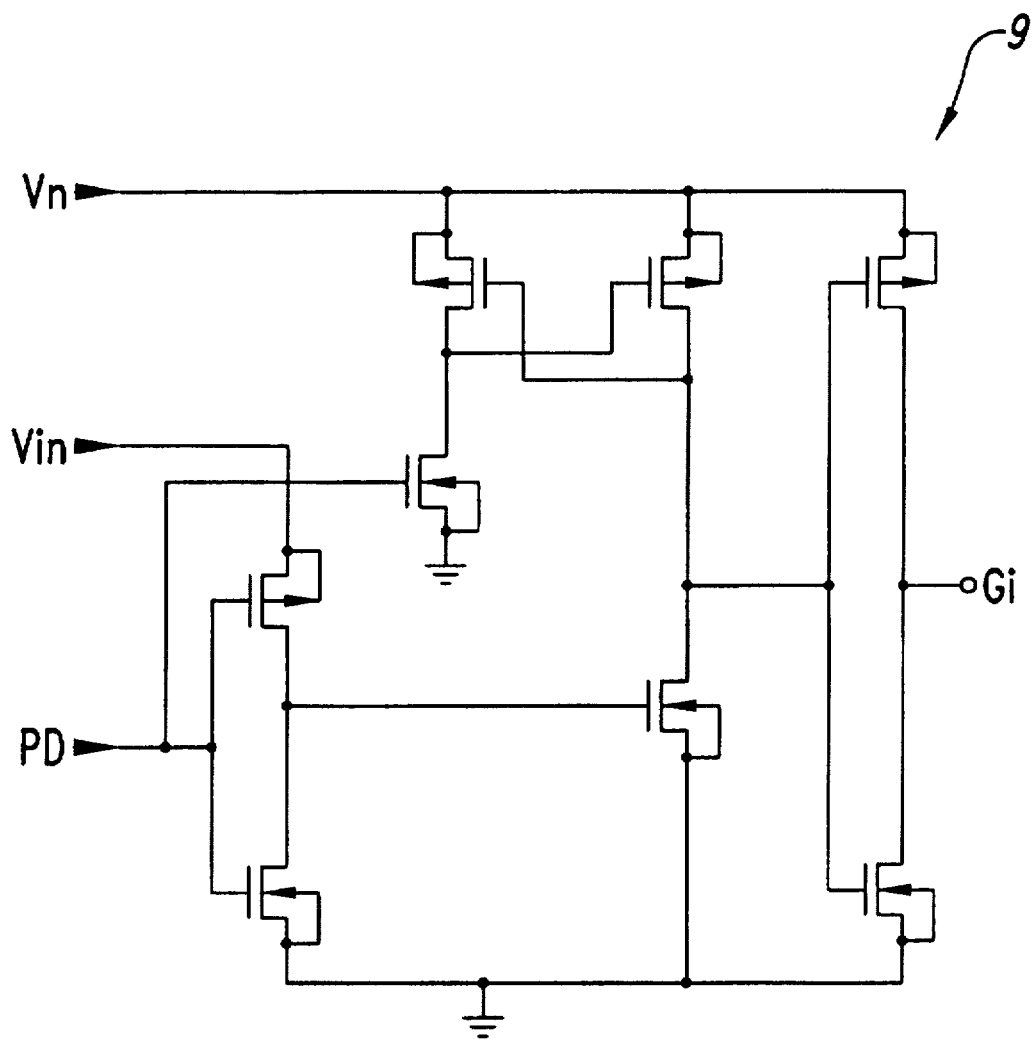
FIG. 6 shows a schematic view of an example of embodiment of a lever shifter stage incorporated in the generator of FIG. 5.

The network of level shifter 7 has the task of producing the final values of the voltages Gm and Bm. In FIG. 6 there is schematically shown a possible example of embodiment of a level shifter circuit block.

Each one of the n zener zapping devices of the network 5 is pre-polarized in a high state that corresponds to a trimming branch ranging from the one least significant to the one of greatest weight.

During the EWS test phase, to burn the m-th zapping zener means to change its logic state from 1 to 0 and this entails that the corresponding MOS M be taken into a state ON with a corresponding insertion in the termination of the branch MOS-Resistor.

In the embodiment herein described by way of indicative and not limitative example, the cell 2 is repeated nine times, in order to be connected to a Bus with nine lines, which are all controlled by means of a unique network of firing, decoding and level shifter as that shown in FIG. 5.

During the EWS test phase, the reading of the resistance of termination is carried out on one of the nine terminations, for example on the central one to better contain the spreads between a termination and the other.

As already previously mentioned, the structure of termination according to the present invention is equipped with means of compensation in temperature.

More in particular, deriving as function of temperature the equation (1), we obtain $$dR_{TERM}/dT = dR_{DS\_MOS}/dT + dR/dT \qquad (11)$$

with:

$$dR_{DS\_MOS}/dT > 0 \qquad (12)$$

Because the resistance of the MOS transistors is due to a layer of suitably doped semiconductor material, whereas the ratio dR/dT has a value linked to the structure from which the resistor is formed, once known the used ratio dR/dT for the resistor, it is necessary to drive the gate of the MOS with respect to the temperature in such a way to obtain a drop of gate-source voltage $V_{GS}$ (it shall be noted that the source terminal of the MOS is at a fixed potential with respect to temperature corresponding to the output of the voltage regulator Vreg) that in temperature can control the $R_{DS}$ of the MOS transistor (which operates in a linear zone) in such a way to compensate the thermal drift of the resistor:

$$dR_{TERM}/dT = dR_{DS\_MOS}/dT + dR/DT \equiv 0 \qquad (13)$$

Figure 7:
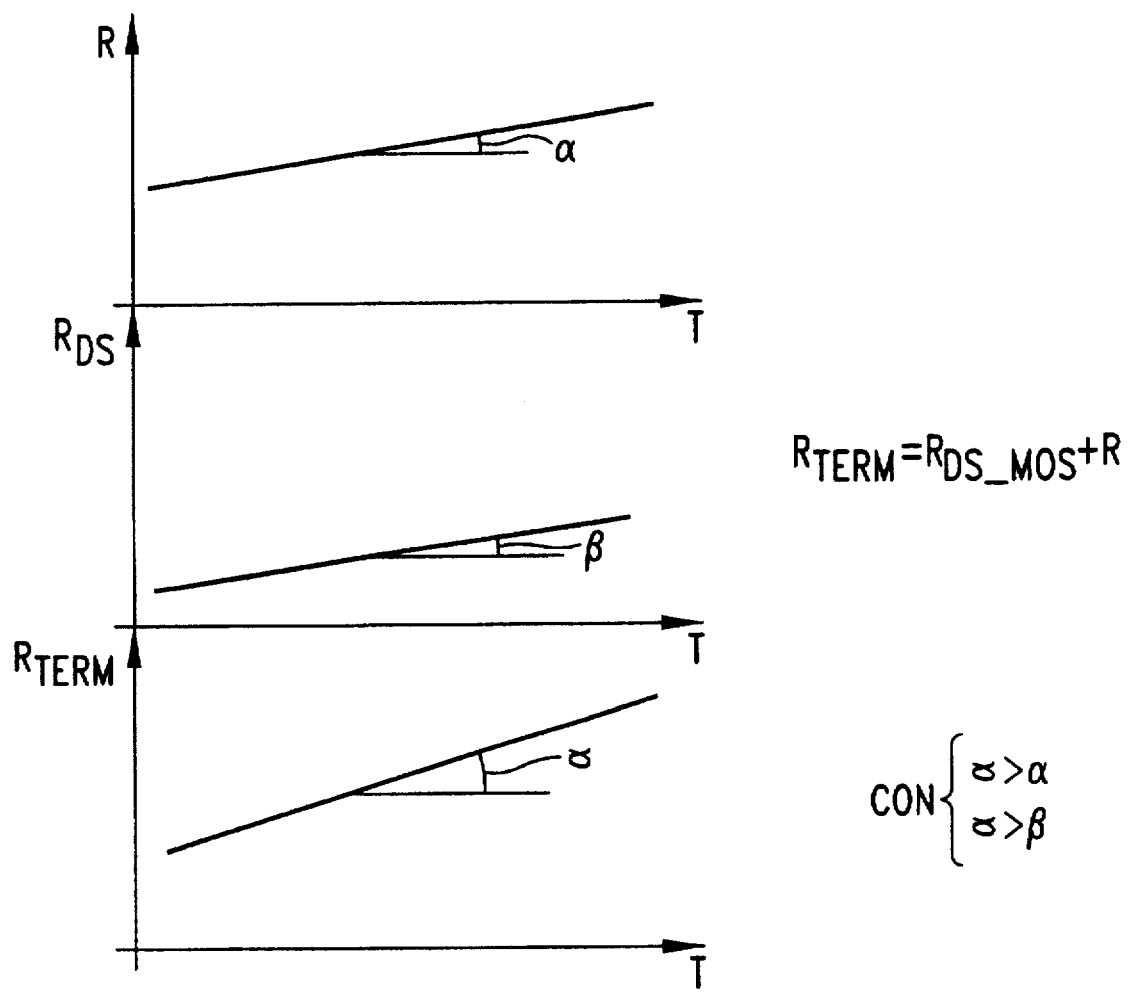
FIG. 7 respectively shows comparative diagrams of resistance-temperature characteristic patterns for a generic resistor and a MOS.

In a traditional application with the gate of the MOS transistor at a fixed potential in temperature, for example the potential of the power supply, a situation of the kind illustrate in FIG. 7 is obtained with a strong drift in temperature of the overall resistance.

The innovative solution foreseen by a method according to an embodiment of the invention proposes to control the gate voltage in temperature in such a way to obtain a voltage drop $V_{GS}$ in temperature such as to force a value of $R_{DS}$ sufficient for compensating the thermal drift of the resistor connected in series to the transistor MOS, just as indicated by the relationship (13).

Figure 8A:
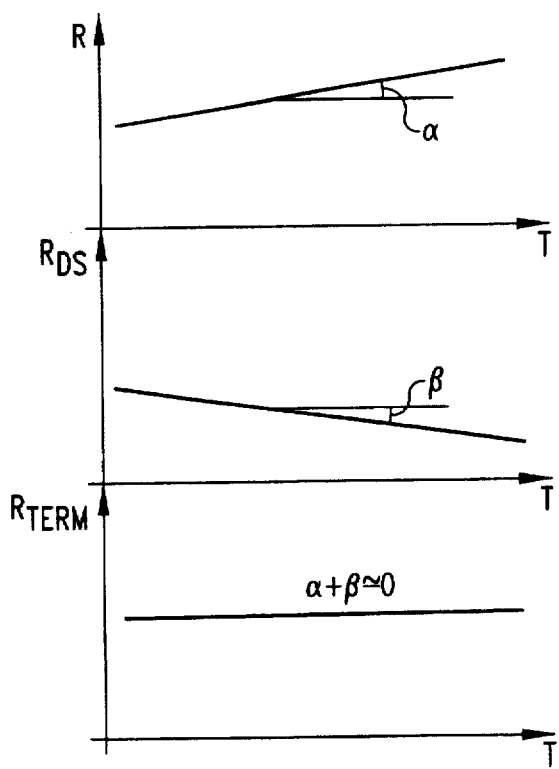
FIGS. 8A and 8B show on respective resistance-temperature diagrams two possible extreme cases of thermal drift of the impedance incorporated in the termination of FIG. 4.
Figure 8B:
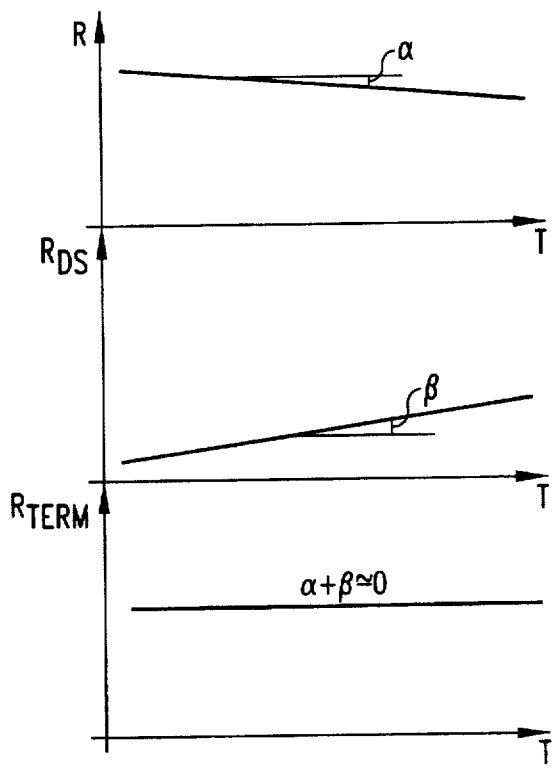

In FIGS. 8A and 8B a comparison is made between two resistance-temperature diagrams of two possible extreme cases of thermal drift of the resistor placed in series to the MOS.

In other words, it is possible to state that the method permits to cause a gate-source voltage drop $V_{GS}$ able to sufficiently "open" the MOS transistor with the purpose of making it operate in a linear zone and with a pattern in temperature such as to determine a resistance $R_{DS}$ having a thermal drift that compensates that of the resistor in series to the MOS transistor.

In fact, in linear zone and at other conditions being equal, from the output characteristics of the MOS we can derive:

$$R_{DS} = f(V_{GS}) \qquad (14)$$

Hence controlling the ratio $dV_{GS}/dT$ it is possible to control the ratio $dR_{DS}/dT$ and as $$V_{GS} = V_G - V_S \qquad (15)$$

with Vs coincident with the output of the regulator, and hence approximately: $dVS/dT \equiv 0$, from which follows:

$$dV_{GS}/dT = dV_G/dT - dV_S/dT \equiv dV_G/dT \qquad (16)$$

Figure 9:
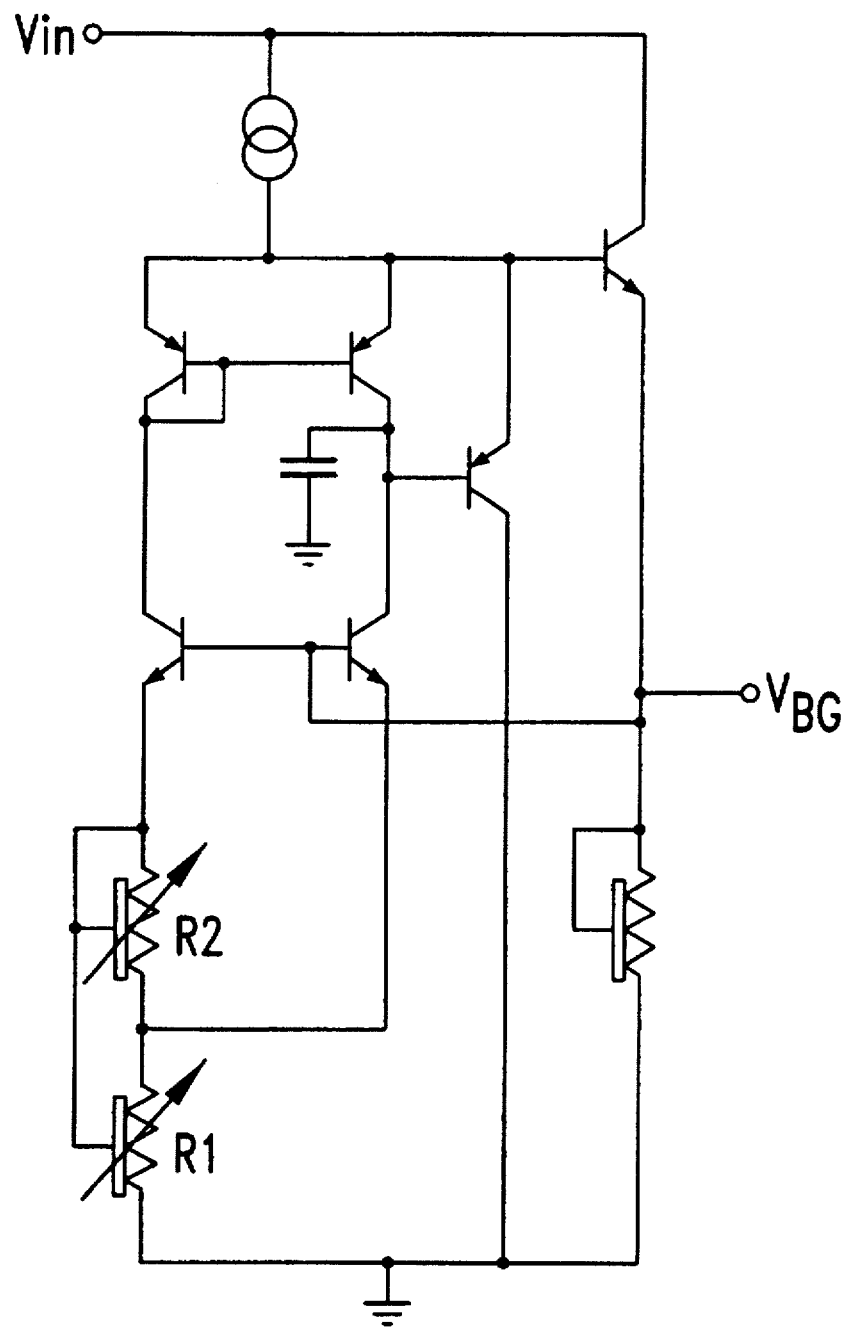
FIG. 9 shows a schematic view of a bandgap voltage regulator of known type.
Figure 10:
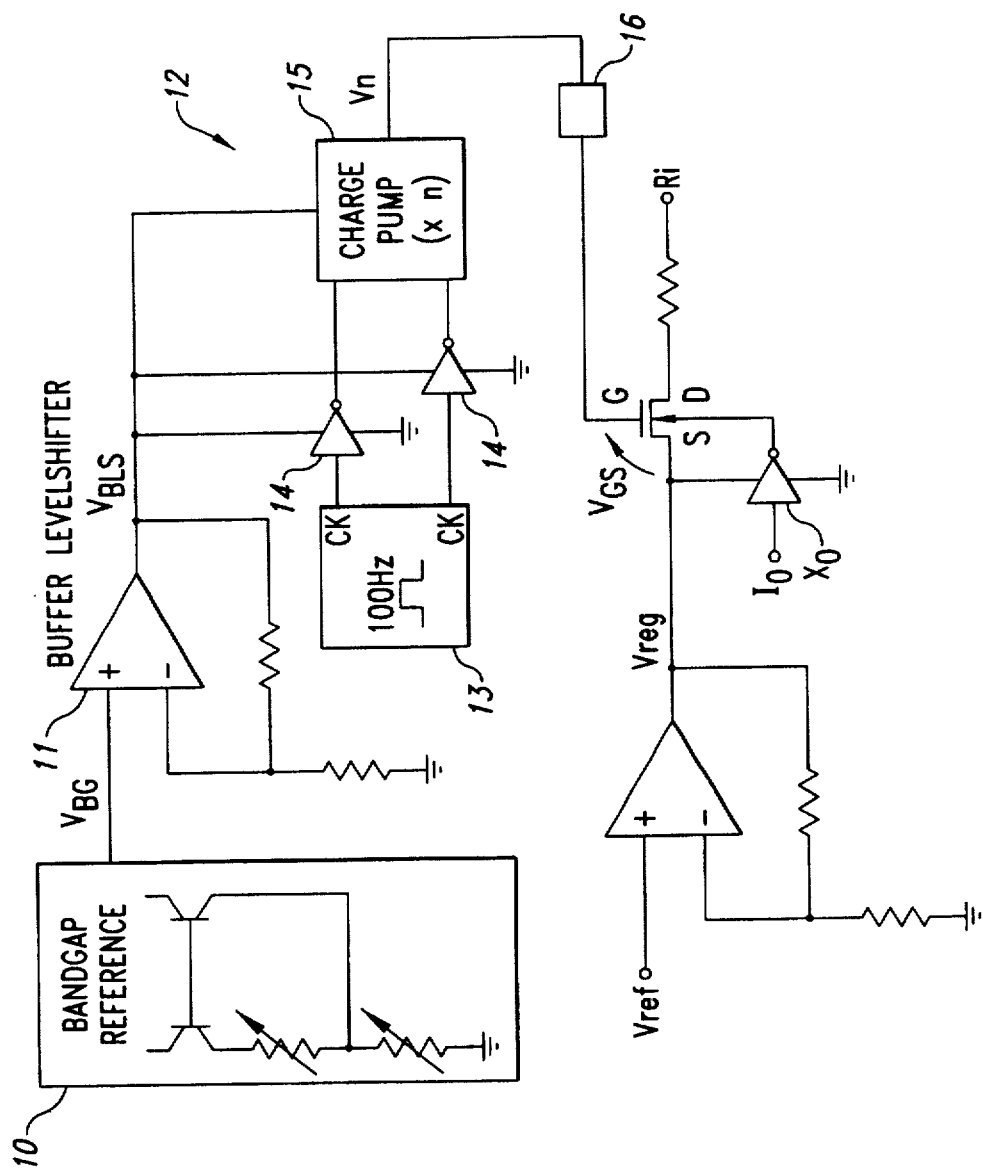
FIG. 10 shows a schematic view of a voltage regulator according to an embodiment of the present invention.

The complete system for controlling the gate voltage is schematically illustrated in FIG. 10 from which the presence can be detected of a regulator stage 10 of stable voltage value $V_{BG}$, for example a Bandgap regulator of conventional type, for instance the one shown in FIG. 9, having the output connected to a level shifter 11.

The bandgap-type regulator stage 10 of reference generates a reference of voltage of about 1.25 V that is applied to the level shifter buffer stage 11 with the purpose of producing a flow of current necessary to the following stage. Such current is produced in output from the shifter 11 with a level voltage shift that takes it to a value $V_{BLS}$. This value of voltage is multiplied by n by a multiplier stage 12 comprising an oscillator 13, a pair of inverters 14 and a charge pump 15.

The output of the charge pump 15 produces a voltage Vn that feeds the cell of the Level-Shifter (block 7 of FIG. 5), the output of which, that may have a value of 0 or Vn, drives the MOS gate in series with the resistor. In case the Level-Shifter takes its own output to the value Vn, we have $$Vn = nV_{BLS} \quad (17)$$

$$V_{GS} = Vn - Vreg \quad (18)$$

$$dV_{GS}/dT = ndV_{BLS}/dT - 0 = ndV_{BG}/dT \quad (19)$$

Therefore, the thermal drift of the voltage $V_{GS}$ that drives the transistor MOS that operates in a linear zone is n times greater than the thermal drift of the bandgap voltage $V_{BG}$ produced by the regulator stage 10.

As the typical feature of a bandgap regulator stage is that of being able to fix in advance the slope of the ramp of the voltage VBG with respect to the temperature T (that is to say to fix the slope $dV_{BG}/dT$) for example acting on a varying resistor internal to the regulator stage 10, with a trimming action on such internal resistor it is possible to set the thermal drift of the stable voltage reference $V_{BG}$.

By level shifting such voltage, and by multiplying the shifted value by n, the voltage on the gate terminal of each MOS transistor inserted onto the branches $A_0$, $A_n$ is obtained.

The method and the device of termination according to embodiments of the present invention achieve a number of advantages, for example: the possibility of forming precise resistors without the use of the laser trimming technique; the possibility of employing such method with any technology provided with MOS transistors to keep constant the temperature coefficient of the termination resistance independently from the trimming action; and the compensation of the thermal drift of a resistance with switch.

Changes can be made to the invention in light of the above detailed description. In general, in the following claims, the terms used should not be construed to limit the invention to the specific embodiments disclosed in the specification and the claims, but should be construed to include all methods and devices that are in accordance with the claims. Accordingly, the invention is not limited by the disclosure, but instead its scope is to be determined by the following claims.

What is claim is:

1. An active precision termination in an integrated circuit comprising:

a cell formed by a plurality of circuit branches provided in parallel and coupled to a common output terminal, each circuit branch including an input terminal, an impedance, and an MOS transistor switch coupled to each other, the MOS transistor switch including a gate terminal that receives a first control voltage signal and a bulk terminal that receives a second control voltage signal; and a generator circuit for generating a plurality of first and second control voltage signals for driving the gate and bulk terminals of the MOS transistor switches of the respective plurality of circuit branches.

2. An integrated voltage regulator for feeding the lines of an external bus by means of respective active terminations each of which comprise a matching impedance connected in series to a switch formed by a MOS transistor, the voltage regulator comprising at least one active termination according to claim 1.

3. An active precision termination of the type incorporated in a voltage regulator interfaced to a bus of an integrated circuit and coupled to lines of the bus, the termination comprising:

a cell including a plurality of circuit branches provided in parallel and coupled to a common output terminal, each circuit branch comprising a matching impedance and a MOS transistor connected in series to each other, wherein a body terminal of each MOS transistor receives a respective first control voltage signal via a respective inverter coupled to the respective MOS transistor.

4. The termination according to claim 3, wherein a control terminal of each MOS transistor receives a respective second control voltage signal.

5. The termination according to claim 3, wherein each inverter is coupled between a first reference voltage and a second reference voltage, the first reference voltage being applied also to a first conduction terminal of each MOS transistor.

6. The termination according to claim 4, wherein the first and second control voltages are capable of controlling the plurality of MOS transistors such that only the MOS transistor of a first branch is initially in a switched-on state, and all of the other MOS transistors in the cell are in a switched-off state.

7. The termination according to claim 4 structured so that the first and second control voltages may be generated by a generator circuit including:

a network of zener elements connected in cascade to a decoding network; and a network of level shifters coupled to the decoding network, the network of level shifters destined to shift the level of the voltages coming out of the decoding network.

8. An integrated circuit for a precision active termination comprising:

a set of termination circuits, each termination circuit including a signal amplifier, a MOS transistor having a control and a bulk terminal, and an impedance all coupled in series, the set of termination circuits all coupled to a single output terminal; and a control voltage generator circuit structured to generate control voltages for driving the control and bulk terminals of the integrated circuit.

9. The active termination integrated circuit of claim 8 wherein each of the impedances has a different impedance value.

10. The active termination integrated circuit of claim 9 wherein the impedances are related to one another in a binary progression.

11. The active termination integrated circuit of claim 8 wherein the control voltage generator circuit is structured to turn some of the MOS transistors off, and some of the MOS transistors on, in order to provide a precise termination impedance at the output terminal.

12. The active termination integrated circuit of claim 8 wherein the control voltage generator circuit is structured modulate the control voltages in order to provide a thermally stable termination impedance at the output terminal.

13. The active termination integrated circuit of claim 8 wherein the control voltage generator circuit is structured to, in an initial state, turn on one of the MOS transistors into a conductive state, and to keep all of the other MOS transistors in a non-conductive state.

* * * * *